United States Patent [19]

Kingsford

[11] Patent Number: 4,871,196
[45] Date of Patent: Oct. 3, 1989

[54] DOUBLE SHIELD FITTING

[75] Inventor: Kenji A. Kingsford, Devore, Calif.

[73] Assignee: Mace Corporation, Upland, Calif.

[21] Appl. No.: 150,776

[22] Filed: Feb. 1, 1988

[51] Int. Cl.⁴ .............................................. F16L 21/04
[52] U.S. Cl. ................................... 285/138; 285/177;
285/323; 285/348; 285/423
[58] Field of Search ............... 285/322, 323, 138, 139,
285/133.1, 423, 12, 177, 348

[56] References Cited

U.S. PATENT DOCUMENTS

| | | | |
|---|---|---|---|
| 2,268,263 | 12/1941 | Newell et al. | 285/138 X |
| 3,375,025 | 3/1968 | Engel | 285/348 |
| 3,612,577 | 10/1971 | Pope | 285/138 X |
| 3,980,112 | 9/1976 | Basham | 285/133.1 |
| 4,107,452 | 8/1978 | Razvi | 285/323 X |

FOREIGN PATENT DOCUMENTS 1393452  2/1965  France ................................ 285/177

*Primary Examiner*—Dave W. Arola
*Attorney, Agent, or Firm*—Flynn, Thiel, Boutell & Tanis

[57] ABSTRACT

A fitting arrangement where a fitting body has a collar portion for accommodating an end of an inner plastic tube. The collar portion defines a tapered seat which cooperates with a tapered ferrule which surrounds the tube and which abuts a tapered gripping sleeve which also surrounds the tube. An intermediate one-piece annular member has a nut part which externally threads onto the collar portion, and also has an interior conical seat which wedgingly cooperates with the gripping sleeve to wedgingly hold the ferrule and gripping sleeve between the opposed seats to radially compress them against the inner tube. This intermediate member also has a collar part projecting axially thereof for surrounding the end of a concentric outer tube. An annular nut surrounds the outer tube and is externally threaded onto the collar part. The collar part and nut define opposed truncated conical seats which cooperate with truncated conical surfaces defined on gripping and ferrule rings which externally surround the outer tube, whereby these latter rings radially compressed into sealing engagement with the outer tube.

8 Claims, 1 Drawing Sheet

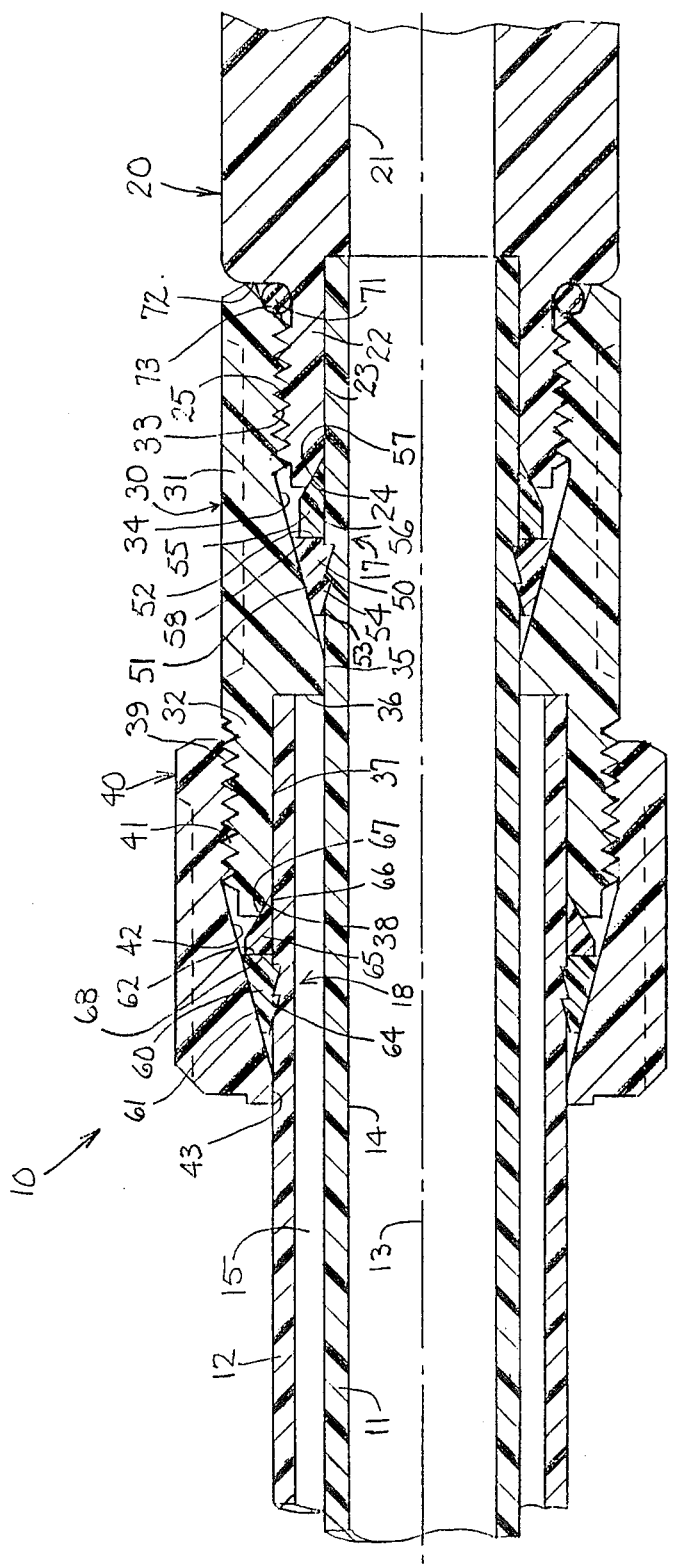

ns to a fitting arrangement for sealingly coupling a plastic fitting to a length of plastic tube by means of a compressive engagement and, in particular, to an improved fitting arrangement which creates a double seal by means of compressive engagement with the ends of concentric inner and outer plastic tubes.

BACKGROUND OF THE INVENTION

Fitting arrangements for effecting a compressive sealed engagement to the end of a nonthreaded tube, particularly a plastic tube, are well known. Such fitting arrangements conventionally employ a fitting body which has a collar part which telescopes onto the end of the plastic tube, which collar part is threadably engaged with an annular nut which surrounds the tube. The annular nut and collar part have opposed interior conical seats, and a ferrule and a gripper ring are disposed in surrounding relationship to the tube between the opposed conical seats on the nut and collar part. These rings have exterior conical surfaces which cooperate with the seats, with the gripper ring also having interior teeth adapted to bite into the plastic tube. Threading of the nut onto the collar part causes axial compression of the rings between the opposed seats, and radial compression of these rings into sealing engagement with the plastic tube. Fitting arrangements of this type are extensively utilized in conjunction with plastic tubes which are used for confining and transporting dangerous fluids, for example high temperature and/or caustic fluids (such as acids), such as extensively utilized in the semiconductor industry.

Copending application Ser. No. 092 163, owned by the assignee of this application, illustrates therein an improvement with respect to a fitting arrangement of this general type. The disclosure of this copending application is incorporated herein, in its entirety, by reference.

Fitting arrangements of the above-mentioned types are suitable for sealingly engaging only a single plastic tube. However, in some instances it is desirable to utilize concentric inner and outer plastic tubes, with the outer tube hence functioning as a containment for loosely surrounding the inner tube through which the main fluid flows. For example, when using this outer concentric tube so that there is additionally defined an annular passage within the outer tube in surrounding relationship to the inner tube, this additional passage can have a sensor fluid supplied therethrough so as to detect any leaks from the inner tube. Another possible usage for the outer tube is the ability to pump a heated liquid therethrough in surrounding relationship to the inner tube for maintaining temperature control of the primary or inner tube. A further possibility is merely the ability to pump a second liquid coaxially by means of this additional passage. A still further possible use for this outer tube is due to the fact that the tubing is conventionally Teflon and hence exhibits an effusion problem with respect to some gases such as natural gas, nitrogen and the like, so that small quantities effuse through the wall of the tube and these small quantities will hence be trapped in the outer passage defined by the outer tube. This outer passage can have a shielding gas pumped therethrough for monitoring such leakage. Further, this outer tubing basically provides a second wall for safety purposes, as when pumping liquids such as hot acids.

At the present time, in situations where concentric inner and outer plastic tubes are being used, the inner tube has the end thereof compressingly sealed to a standard fitting of the type described above. The adjacent end of the outer tube must also be sealed at substantially the same location, and such applications currently use a standard hose clamp for sealingly clamping the end of the outer tube to the inner tube. Use of a conventional hose clamp in this type environment, however, is less than desirable since in many instances this clamping occurs directly between the tubes and hence the outer tube does not provide a second seal effective for confining any leakage through the fitting arrangement. Further, hose clamps themselves are highly questionable as to the seal which is achieved between the tubes.

Accordingly, this invention relates to an improved fitting arrangement for use in sealing engagement with concentric inner and outer plastic tubes, which fitting arrangement creates a double shield or seal in that it sealingly engages the ends of both the inner and outer tubes thereby providing an arrangement which is more effective in performance and efficient to utilize then the prior known structures.

More specifically, in the improved fitting arrangement of the present invention, the same is provided with three main body parts, namely a fitting body which telescopes onto the end of the inner tube, a nut which surrounds the adjacent end of the outer tube, and an intermediate annular body which is disposed in surrounding relationship to the tubes axially between the nut and fitting body. This intermediate body has a collar part at one end which cooperates with the nut, and a nut part at the other end which cooperates with the fitting body. The nut part and fitting body compress ferrule and gripper rings therebetween into sealing engagement with the inner tube, and similarly the collar part and nut compress therebetween a further pair of ferrule and gripper rings into sealing engagement with the outer tube. Two highly effective compressive seals are thus obtained.

Other objects and purposes of the invention will be apparent to persons familiar with fitting arrangements of this general type upon reading the following specification and inspecting the accompanying drawings.

BRIEF DESCRIPTION OF THE DRAWINGS

The single drawing illustrates, in central cross section, the double-shield fitting arrangement of this invention as compressively sealed onto the adjacent ends of concentric inner and outer plastic tubes.

Certain terminology will be used in the following description for convenience in reference only, and will not be limiting. For example the words "upwardly", "downwardly", "leftwardly", and "rightwardly" will refer to directions in the drawings in which reference is made. The words "inwardly" and "outwardly" will refer to directions toward and away from, respectively, the geometric center of the arrangement and designated parts thereof. Said terminology will include the words specifically mentioned, derivatives thereof, and words of similar import.

DETAILED DESCRIPTION

Referring to the drawing, there is illustrated a double-shield fitting arrangement 10 which is adapted to be sealingly engaged with the free ends of nonthreaded inner and outer tubes 11 and 12, respectively. These tubes are conventionally of a deformable material, such as a plastic tube (typically Teflon), and they extend concentrically relative to one another along a longitudinally extending central axis 13 thereof. The inner tube 11 defines therein a main flow passage 14 through which a primary fluid flows. The outer tube 12 loosely surrounds the inner tube 11 so that there is defined a secondary annular flow passage 15, the latter often being referred to as a containment passage. The fitting arrangement 10 has first means 17 which cooperate with the end of the inner tube 11 to create a compressive sealed engagement therewith, and second means 18 which cooperates with the end of the outer tube 12 for creating a compressive sealed engagement therewith.

The fitting arrangement 10 includes three main annular bodies 20, 30 and 40 which surround the tubes and are axially coupled together. The fitting arrangement 10 also includes a first pair of rings 50 and 55 which surround the inner tube 11 and coact directly with the annular bodies 20 and 30. The fitting arrangement 10 also includes a second pair of cooperating rings 60 and 65 which surround the outer tube 12 and cooperate directly with the bodies 30 and 40. The individual parts of the fitting arrangement 10, and the functional relationships, will now be explained.

The annular fitting body 20 has an interior passage 21 therein, at least a part of which is adapted to coaxially align and communicate with the interior passage 14 defined by the inner tube 11. To couple the fitting body 20 to the free end of the inner tube 11, the fitting body 20 has an annular collar part 22 which projects therefrom. This collar part 22 defines therein a bore 23 for snugly receiving therein the free end of the inner tube 11, which tube abuts against a shoulder defined at the end of the bore 23. Collar part 22 at the free end thereof defines thereon a tapered seat 24 which is of a truncated conical configuration, and which concentricly surrounds the inner tube 11 and which converges inwardly so as to merge with the bore 23 as the annular 24 seat projects axially inwardly. The collar part 22 also has an annular thread 25 formed exteriorly therearound.

The annular fitting body 20 may be of any conventional configuration, such as a tee, a coupling, an adapter or an elbow, so as to permit the inner tube 11 to be sealingly coupled to some other component or tube.

The intermediate annular body 30 defines two main parts, namely an annular nut part 31 which is adapted to cooperate with the fitting body 20, and an annular collar part 32 which is adapted to cooperate with the annular body 40. These annular parts 31 and 32 are integrally formed as a one-piece member and are disposed at opposite axial ends of this member or body 30. The parts 31 and 32 define a bore which extends coaxially through the body 30, this bore being defined by several parts of variable diameter as is apparent from the following description.

More specifically, the annular nut part 31 has a first bore 33 which opens inwardly from the free end thereof, this bore being internally threaded so as to be threadably engagable with the external threads 25 formed on the collar part 22. The bore 33, at its inner end, joins to a further bore 34 which projects coaxially inwardly. This bore 34 is of a truncated conical configuration which slopes or tapers radially inwardly as it projects axially toward the collar part 32. The tapered bore 34 in turn terminates in a further bore 35 which is of rather short axially extent. The bore 35 is cylindrical and of a diameter which closely and snugly surrounds the exterior wall of the inner tube 11. The bore 35 terminates at an annular wall or shoulder 36 which projects generally radially outwardly, and the annular collar part 32 projects axially away from this shoulder 36.

Collar part 32 defines therein a cylindrical bore 37 which is of substantially greater diameter then the bore 35, and in fact the diameter of bore 37 is selected so that it will closely and snugly accommodate therein the outer diameter of the outer tube 12. This collar part 32 (like the collar part 22 described above) has an annular tapered seat 38 which is defined at the free end thereof and which slopes radially inwardly as it projects axially inwardly so as to merge with the bore 37. This tapered seat 38 is of a truncated conical configuration. The exterior of the collar part 32 has a conventional external thread 39 formed thereon.

Annular body 40, commonly referred to as a nut, also has a variable-diameter bore extending coaxially therethrough. This includes a bore 41 which opens inwardly from one end thereof, this bore being internally threaded so as to be engagable with the external threads 39 defined on the collar part 32. The threaded bore 41 in turn joins to an intermediate bore 42 which is of a tapered or truncated conical configuration. This tapered bore 42 is sloped so that it radially converges toward the outer tube 12 as the tapered bore projects axially toward the other end of the nut. The tapered bore 42 at its axially other end joins to a further cylindrical bore 43 which is of uniform diameter and which opens outwardly through the other end of the nut. This bore 43 has a diameter which is of similar magnitude but normally only slightly larger than the diameter of the outer wall of tube 12 so as to snugly embrace the latter.

Considering now the gripper 50, it is constructed as a one-piece ring having an outer truncated conical annular wall 51 which slopes radially outwardly as it projects axially toward the collar part 22. The gripper 50, at the end thereof where the conical outer wall 51 is of maximum diameter, has an axial end face 52. The gripper ring 50 has a bore 53 extending therethrough, which bore is significantly larger than the outer diameter of tube 11 when the gripper ring 50 is in a relaxed or nondeformed condition. The gripper ring 50 has at least one, and preferably two or more, annular teeth or ribs (i.e., gripping ribs) 54 which are formed integrally with the ring and project radially inwardly in surrounding relationship to the bore 53. These ribs 54 are preferably slightly axially spaced from one another and project radially inwardly so as to define a diameter therein which approximately equals the external diameter of the tube 11 when the gripper 50 is in a nondeformed condition. These gripping ribs 54 preferably create a one-way gripping function since, as illustrated in the drawing, each rib terminates in a generally transversely extending rear face (the rightward face in the drawing), whereas the front face (the leftward face in the drawing) is of a generally outwardly projecting slope since this facilitates the sliding of the gripper sleeve 50 onto the free end of the tube 11, but effectively prevents reverse movement when the gripping ribs penetrate the tube. This one-piece gripper ring 50 is preferably axially split by means of a single slit or slot (not shown) which extends throughout the axial length thereof so as to facilitate inward radial deformation or contraction of the gripper ring when external compression is applied thereto.

The ferrule 55 is also formed as a one-piece ring having a bore 56 extending coaxially therethrough, which bore 56 equals or slightly exceeds the outer diameter of the tube 11 so as to permit the latter to be slightably but snugly moved through the ferrule. This ferrule ring 55 has an outer annular wall 57 which is of a truncated conical configuration which slopes inwardly as it projects axially toward the free end (that is, the rightward end) so that this truncated conical wall 57 hence merges or intersects with the bore 56 so as to effectively define a rather sharp point or corner. The other end of the ferrule ring 55 defines thereon a substantially planer end face 58 which is substantially perpendicular to the axis 13, and which is adapted to abut against the opposed end face 52 formed on the gripper ring 50.

As illustrated in the drawing, the rings 50 and 55 directly axially abut one another, and in turn are axially confined between and cooperate with the opposed sloped seats 24 and 34.

More specifically, the tapered wall or seat 57 on the ferrule 55 is adapted to wedgingly cooperate with the flared or tapered seat 24 formed on the end of the collar part 22. These tapered seats 24 and 57 may be of identical slope. In a preferred embodiment, however, these two seats preferably have slightly different slopes, for example the flared seat 24 has a preferred slope of about 33° and the tapered seat 57 has a preferred slope of about 30° relative to the longitudinal axis 13.

In a similar fashion, the tapered wall or seat 51 on the gripper ring 50 is adapted to directly wedgingly cooperate with the tapered wall or seat 34 defined on the nut part 31. The slopes of these opposed seats 34 and 51 may be identical. However, in the preferred embodiment, they are preferably slightly different. For example, the slope of the exterior annular wall 51 of the gripper preferably extends at an angle of inclination (as measured relative to axis 13) which is slightly greater than the angle of inclination defined by the tapered interior wall 34 on the nut part 31. In fact, the angle of inclination of the gripper wall 51 preferably exceeds the angle of inclination of the bore wall 34 by a differential in the range of about 4° to about 10°, with this differential preferably being in the range of about 5° to about 7°. The slope or angle of inclination of the gripper outer wall 51 is preferably about 20°, and the slope or angle of inclination of the bore wall 34 is preferably about 15°.

The preferred configuration for the gripper ring 50 and ferrule ring 55 are explained in greater detail in my aforementioned copending application Ser. No. 092 163.

In a similar fashion, the gripper 60 and ferrule 65 axially abut one another and axially cooperate between the opposed tapered seats 38 and 42.

The gripper 60 is substantially identical to the gripper 50 (except for being of larger diameter) in that it comprises a one-piece ring which is axially split, and has an outer truncated conical wall 61 adapted to react against the tapered seat 42, and an axial end face 62 adapted to bear against the opposed axial end face 68 on the ferrule 65. The gripper has teeth or ribs 64 adapted to embed or penetrate the outer wall of the outer tube 12. The ferrule 65 is also a one-piece ring having a bore 66 therethrough which closely and snugly accommodates the outer diameter of the tube 12, and has a tapered or truncated conical outer surface 67 which cooperates with the opposed tapered seat 38 formed on the collar part 32. The geometry of the gripper 60 and ferrule 65, including the various slopes and relationships, substantially correspond to those possessed by the gripper 50 and ferrule 55 respectively, and the associated tapered seats.

All of the components of the fitting assembly 10, as described above, are preferably constructed of a synthetic resin or plastic, such as Teflon. For example, the annular bodies 20, 30 and 40, together with the ferrules 55 and 65, are preferably molded or formed of PFA or TFE Teflon. The grippers 50 and 60 are also formed of a plastic material, preferably being molded of a liquid crystal polymer (LCP) so as to have resistance to media degradation while offering high strength and excellent temperature capabilities. As alternate materials, the grippers may also be constructed of PEK (Polyetherketon) or PEEK (Polyetheretherketone).

In the improved fitting arrangement 10 of this invention, there is additionally provided a secondary seal disposed for cooperation between the fitting body 20 and the nut part 31. For this purpose, there is provided an elastomeric seal ring 71 (an 0-ring) which snugly surrounds the base of the collar part 22 directly adjacent a base wall 72, with this seal ring 71 being compressed into engagement with a tapered wall or seat 73 formed at the free end of the nut part 31 directly adjacent the entrance to the threaded bore 25. This 0-ring 71 is preferably a Teflon-covered elastomer or an elastomeric fluoropolymer such as Kalrez or Valflon.

OPERATION

The assembly of the fitting arrangement 10, and its cooperation with the tubes 11 and 12, will be briefly described to insure a complete understanding thereof.

The fitting arrangement 10 is assembled by inserting the nut 40, gripper 60 and ferrule 65 over the free end of the outer tube 12, and thereafter fitting the free end of this outer tube 12 into the bore 37 of the collar part 32. The nut 40 is then rotatably threaded onto the collar part 32 and, this initial threading of the nut onto the collar part 32, results in proper positioning of the gripper and ferrule so that they are properly positioned for engagement with the respective tapered seats, even though no significant radial compression of either the ferrule or gripper has yet occurred. Continued threading of the nut 40 onto the threaded collar part 31, however, does cause the tapered walls on the ferrule and gripper to respectively cooperate with the tapered seats on the collar part and nut, whereupon the gripper 60 is radially compressed so that the gripping ribs thereon effectively bite into the wall of the outer tube 12. At the same time the ferrule 65 is axially wedgingly compressed between the outer wall of the tube 12 and the opposed tapered seat 38 so that the leading or tapered end of the ferrule effectively causes local deformation of the outer wall of the tube 12 to create an effective seal between the tube and the collar part 32.

In similar fashion, the gripper 50 and ferrule 55 are slid over the free end of the inner tube 11 so as to be received within the tapered bore 34 defined within the nut part 31 of the member 30. The free end of the tube 11 is fitted into the bore defined by the collar part 22, and due to relative rotation therebetween, the gripper 50 and ferrule 55 are caused to respectively bitingly engage and deform the inner tube 11 to create a seal therewith, similar to the same sealing operation which exists with respect to the outer tube described above.

While the above description indicates tightening of the fitting relative to the outer tube prior to tightening of the fitting relative to the inner tube, it will be appreciated that in many instances this tightening operation is reversed. That is, all of the parts will be initially telescopically slidably inserted over the respective tubes 11 and 12 without effecting tightening of any of the parts. After all of the parts have been properly positioned, then the body 30 will be rotatably threadably engaged onto the collar art 22 to effect tightening of the gripper 50 and ferrule 55. After this tightening, then the nut 40 will be rotatably threaded onto the collar part 32 to effect tightening of the gripper 60 and ferrule 65.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A fitting arrangement adapted to be sealingly joined to ends of concentric inner and outer plastic tubes, comprising:

a fitting body having a flow passage therethrough, said fitting body having an annular collar portion which snugly telescopes over the end of said inner tube so that the interior of said inner tube communicates with said flow passage, said collar portion being externally threaded, said collar portion also defining thereon adjacent a free end thereof, and in surrounding relationship to said inner tube, a first tapered seat;

an intermediate annular body disposed in surrounding relationship to said inner and outer tubes and having bore means of an irregular diameter extending therethrough;

said intermediate annular body being of one piece and defining an annular nut part adjacent one end thereof and an annular collar part adjacent the other end thereof;

said annular nut part having an internally threaded bore opening disposed inwardly from a free end thereof for threaded engagement with said collar portion, said nut part having a truncated conical bore which projects axially away from said threaded bore and which slopes inwardly as it projects axially until reaching a diameter which is at least as large as said inner tube, said truncated conical bore defining a second tapered seat which in cooperation with the generally opposed first seat defines a first annular chamber in surrounding relationship to said inner tube;

a first one-piece gripping sleeve disposed within said first chamber in surrounding relationship to said inner tube, said gripping sleeve having a truncated conical outer surface disposed in engagement with said second tapered seat and radially inwardly projecting gripping means for grippingly deforming the inner tube to axially secure the gripping sleeve thereto;

a first one-piece wedge-shaped ferrule disposed within said first chamber in surrounding relationship to said inner tube, said ferrule having an outer truncated conical surface disposed in engagement with said first tapered seat, said ferrule having an inner annular wall which closely and snugly surrounds the outer surface of said inner tube, said ferrule and said gripping sleeve having end surfaces which directly oppose and abuttingly engage one another;

said collar part of said intermediate body being snugly telescopically disposed over the end of said outer tube, said nut part defining thereon a third tapered seat formed as a truncated conical surface which slopes axially and radially inwardly from the free end of said collar part;

a one-piece annular nut disposed in surrounding relationship to said outer tube, said nut having a threaded bore opening coaxially inwardly from one end thereof for threaded engagement with said collar part, said nut also having a truncated conical bore opening axially inwardly thereof from said last-mentioned threaded bore so as to define a fourth tapered seat which slopes radially inwardly toward the outer tube as it projects axially inwardly of the nut, said third and fourth seats cooperating in generally opposed relationship to one another to define a second annular chamber in surrounding relationship to said outer tube;

a second one-piece gripping sleeve disposed within said second chamber in surrounding relationship to said inner tube, said second gripping sleeve having a truncated conical outer surface disposed in engagement with said fourth tapered seat and radially inwardly projecting gripping means for grippingly deforming the outer tube to axially secure the second gripping sleeve relative thereto;

a second one-piece wedge-shaped ferrule disposed within said second chamber and surrounding relationship to said inner tube, said second ferrule having an outer truncated conical surface disposed in engagement with said third tapered seat, said second ferrule having an inner annular wall which closely and snugly surrounds the outer surface of said outer tube, said second ferrule and said second gripping sleeve having end surfaces which directly oppose and abuttingly engage one another.

2. An arrangement according to claim 1, including an annular elastomeric seal ring disposed in surrounding relationship to said collar portion and sealingly confined between said fitting body and the collar part of said intermediate member, said elastomeric seal ring being located exteriorly of the threaded engagement between said nut part and said collar portion.

3. An arrangement according to claim 1, wherein said nut, said intermediate annular body and said fitting body are each formed in one piece of Teflon.

4. A fitting arrangement, comprising:

a first elongate plastic tube terminating in a first free end and defining a first flow passage therethrough;

a second elongate plastic tube disposed in substantially concentric and surrounding relationship to said first plastic tube and defining therebetween an annular second flow passage which is disposed within said second tube in surrounding relationship to said first tube, said second tube terminating in a second free end which is in the vicinity of said first free end;

a fitting body having a third flow passage therethrough, said fitting body having an annular collar portion which snugly fits over said first free end so that said first flow passage and said third flow passage are axially aligned and communicate with each other, said collar portion being externally threaded;

an intermediate annular body disposed in surrounding relationship to said first and second elongate plastic tubes, said intermediate annular body being of unitary construction and having an annular nut part defined adjacent one end thereof and an annular collar part defined adjacent the other end thereof;

said annular nut part having an internally threaded bore opening disposed inwardly from a free end thereof in threaded engagement with said collar portion;

said collar part of said intermediate body being snugly, fittingly disposed over the end of said second tube and externally threaded; and an annular nut of unitary construction disposed in surrounding relationship to said second tube, said nut having a threaded bore opening disposed coaxially inwardly from one end thereof in threaded engagement with said collar part; and means for sealingly retaining said first and second elongate plastic tubes within said fitting body.

5. An arrangement according to claim 4, wherein said means comprises first sealing means coacting between said first tube and said annular body in the vicinity of said first free end for creating a sealed relationship between said first tube and said annular body and second sealing means coacting between said annular nut and said second tube in the vicinity of said second free end for creating a sealed engagement between said second tube and said annular nut.

6. An arrangement according to claim 5, wherein said first sealing means comprises a first wedge-like sleeve means disposed in surrounding relationship to said first tube and positioned within an annular chamber defined by said collar portion and said first tube for sealingly engaging the outer wall of said first tube and a first one-piece gripping sleeve in contact with said first wedge-like sleeve means and said annular body and disposed in surrounding relationship with said first tube, and said second sealing means comprises a second wedge-like sleeve means disposed in surrounding relationship to said second tube and positioned within a second annular chamber defined by said collar part and said second tube for sealingly engaging the outer wall of said second tube and a second one-piece gripping sleeve in contact with said second wedge-like sleeve means and said annular nut and disposed in surrounding relationship with said second tube.

7. A fitting arrangement according to claim 6, wherein each of said first and second gripping sleeves comprise radially inward projecting gripping means for grippingly deforming the first and second tubes respectively to axially secure the gripping sleeves thereto.

8. A fitting arrangement according to claim 7, wherein the fitting body, the intermediate annular body and the annular nut are each formed in one piece of Teflon.

* * * * *